United States Patent [19]

Gohlisch

[11] Patent Number: 5,362,001
[45] Date of Patent: Nov. 8, 1994

[54] APPARATUS FOR PULVERIZING RUBBER SCRAP

[75] Inventor: Hans J. Gohlisch, Hanover, Germany

[73] Assignee: Paul Troester Maschinenfabrik, Hanover, Germany

[21] Appl. No.: 52,336

[22] Filed: Apr. 23, 1993

[30] Foreign Application Priority Data

Apr. 25, 1992 [DE] Germany .............................. 4213607

[51] Int. Cl.⁵ .............................................. B02C 4/34
[52] U.S. Cl. .................................. 241/160; 241/230; 241/240; 241/241.5; 241/DIG. 31
[58] Field of Search ............. 241/160, 241.5, DIG. 31, 241/230, 240

[56] References Cited

U.S. PATENT DOCUMENTS

| | | | |
|---|---|---|---|
| 92,997 | 7/1869 | Peabody | 241/240 |
| 1,509,730 | 9/1924 | Hughes | 241/240 |
| 3,910,506 | 10/1975 | Pecci | 241/230 X |
| 4,485,977 | 12/1984 | Silverthorn et al. | 241/230 |
| 4,819,331 | 4/1989 | Joyama | 241/241.5 X |
| 5,255,860 | 10/1993 | Timmons | 241/DIG. 31 X |

FOREIGN PATENT DOCUMENTS

| | | | |
|---|---|---|---|
| 552801 | 5/1923 | France | 241/241.5 |
| 671248 | 2/1939 | Germany | 241/159 |
| 1204255 | 1/1986 | U.S.S.R. | 241/160 |
| 1357071 | 12/1987 | U.S.S.R. | 241/241.5 |

*Primary Examiner*—Mark Rosenbaum
*Assistant Examiner*—Frances Han
*Attorney, Agent, or Firm*—Emmanuel J. Lobato

[57] ABSTRACT

Rubber scrap is pulverized by feeding it into a gap between a parti-cylindrical recess in a block and a cylinder rotating in the recess. A plurality of blocks are mounted one above another in a first frame, and a like plurality of cylinders are mounted in a second frame. The blocks are so arranged that rubber scrap pulverized in the recess of one block is fed into the recess of the next lower block for further pulverizing. All of the cylinders are driven in rotation by a single motor through a belt or chain drive. A hydraulic cylinder piston unit is provided for raising the first frame relative to the second frame and thereby varying the gaps between the cylinders and the respective recesses of the blocks.

11 Claims, 5 Drawing Sheets

APPARATUS FOR PULVERIZING RUBBER SCRAP

FIELD OF THE INVENTION

The invention relates to apparatus for pulverizing rubber scrap.

BACKGROUND OF THE INVENTION

The recycling of old rubber tires presents a very difficult problem. In the first place, there is considerable difficulty in separating embedded metal parts from the rubber of the tire before the tire runs through the pulverizing machine. Moreover, there is a possibility of reusing the rubber only when the rubber is reduced practically to powder form because it is only in this form that old rubber can be used as an additive in the rubber industry for the production of new rubber ware.

In order to comminute old rubber tires, cutting and shredding tools have been used. According to DE 29 11 251 C2, the tire is clamped in a clamping device, with three outwardly slidable pins, whereupon a tangential cut is made with rotating disk knives to remove the tread with the side strips from the metal inlay containing beads and subsequently other circular disk-form knives are used to cut the rubber into strips which are then fed into cross cutting apparatus. The rubber pieces thus obtained required further comminuting.

Other old rubber tire disintegrating machines are shredders which, with rotating knife cylinders, attack the circumference of the tread and comminute the tread as well as the side strips to chips (SU 36 93 894 A1). A machine according to SU 13 88 294 A1 works in a similar manner. Here the tire is gripped on both sides by saucers and is stressed and pressed so that the tread is bent and deformed and in this narrowed form is subjected to the knives of a shredding cylinder. Comminuting is effected in a similar manner by the comminuting machine of DE 37 04 725 A1, in which the comminuting tools arranged on the rotating comminuting cylinder are small, hard plates, and the comminuting tools themselves are arranged in a particular form.

The old rubber pieces obtained from all of these comminuting processes are technically not yet usable in the rubber industry as an additive. The rubber pieces thus obtained are so large, of such a dissimilar shape and so nonhomogeneous that further working and comminuting presents great difficulty.

Rubber scrap is also produced in the production of new rubber ware when, through production error or mixing error or through use of unsuitable mixtures, damaged goods are produced.

Apparatus for further working such rubber scrap is known through DD 265 855 A1. With this known apparatus, an extruder with several work zones is connected by a radial discharge pipe with a mill having grinding disks defining a conical grinding gap. Different work zones are formed in the extruder through different formation of different screw sections. Bringing the compressed rubber scrap from the extruder into the grinding space is difficult and the grinding of the rubber is problematic.

For rubber is an extremely difficult to comminute material, which is in many respects nonhomogeneous. Through different exposure to the sun's rays, and different loading during the life of an automobile tire, as well as different life spans, the old rubber scrap to be worked on is differently aged. The pieces of old rubber scrap have strongly aged portions, which are relatively easy to pulverize. Other, less aged parts, on the contrary, still have a high degree of elasticity and can hence be comminuted by grinding only with great difficulty or not at all. In most cases, strongly aged portions are integral with less aged portions. They thereby present particular difficulty in comminuting. This difficulty is increased by the presence of foreign material in the form of metal parts in the rubber scrap which are not removable prior to grinding because they are in part surrounded by the rubber and in part the rubber is vulcanized to them. These metal parts have a destructive effect on the grinding disks.

SUMMARY OF THE INVENTION

The present invention eliminates the disadvantages of the state of the art. It is the object of the invention to comminute rubber to a meal-like powder, with simple means and with limited energy consumption.

The apparatus in accordance with the invention comprises a stationary shell having a recess in the form of a hollow cylinder segment and a rotating cylinder arranged in the recess with a gap formed between the shell and the cylinder. In an entry portion, the gap between the cylinder and the shell widens to form a hopper into which the rubber scrap to be pulverized is introduced. This apparatus is extremely simple to construct and provides the possibility of pulverizing rubber scrap introduced between the surface of the stationary shell and the outer circumference of the cylinder rotating in the shell. In this process of pulverizing the rubber, metal parts contained in the rubber promote the pulverization of the rubber. The surfaces of the shell and the cylinder are roughened to a limited extent by the metal parts, and such roughening promotes the pulverizing process of the rubber. It is advantageous when at least the surface of the shell and the cylinder are hardened.

The efficiency of this apparatus is especially high when the cylinder is subjected to a force which presses the cylinder into the recess of the shell and when advantageously adjustable bearing surfaces are provided to provide a predetermined, preferably adjustable gap width.

Structurally, it is very simple when the shell is formed by a half cylinder recess in a parallelepiped block.

For a simple formation of the apparatus it is advantageous when the parallelepiped block has on one side of the semi-cylindrical recess an upward projection which forms a stationary wall of the hopper of which the other wall is formed by an upper surface of the cylinder.

Structurally, the apparatus can be easily formed when opposite sides of the recess are closed by plates secured on opposite sides of the parallelepiped block.

In order to be reduced to a fine powder, large rubber pieces with highly elastic parts must be passed through the apparatus two or more times, whereby it is advantageous when, with each passage, the gap between the cylinder and the surface of the shell is made smaller. In this case it is advantageous when several shells, with respective cylinders, are arranged one above another so that the rubber pieces pass successively through the respective gaps.

Moreover, with this arrangement of several shells disposed one above another, it is advantageous when, between successive shell-cylinder combinations there is provided a sieve, sorting, and/or separating device and/or a metal-seeking and -removing device. In this manner material that has already been sufficiently pulverized, as well as metal parts, are removed from the stream of pulverized rubber scrap so that in the following cylinder-shell combination the gap width can be made smaller and the efficiency of the apparatus is thereby improved.

For the construction of such apparatus having several superposed cylinder-shell units, it is advantageous when the hoppers of successive units are alternately reversed, so that the hopper of a following unit is in position to receive material discharged from a preceding unit.

Structurally, it is advantageous when the blocks of the cylinder-shell units are arranged on a common frame, when the cylinders are arranged in a further common frame, and when the two frames are adjustable relative to one another. This has the advantage that the cylinder axes are arranged in a plane and can be driven in a simple manner by a drive or belt transmission or a chain drive.

With this construction it is advantageous when the two frames are connected with one another by a slidable connection.

In order for the work of this apparatus to have sufficient efficiency, it is advantageous when the two frames are connected with one another through a force-producing or force-receiving device, preferably in the form of a spindle, a hydraulic servo-motor, a lever device or the like.

The work of this apparatus is intensified when the circumferential surface of the cylinder and/or the surface of the recess is formed with knobs, projections, teeth or the like, or is roughened, whereby with several superposed shell-cylinder units, the respective surfaces of different units are formed differently.

Also, when several shells are arranged in a common frame, it is advantageous when the cylinder is subjected to a force which presses the cylinder into the recess and when advantageously adjustable stops are provided which determine a certain, preferably adjustable, gap width, whereby it is advantageous when each cylinder is provided with its own stops, which stops are arranged according to the respective shell arrangement in a particularly manner whereby the gap width does not fall below a predetermined value. In this case it is advantageous when the bearings of the cylinders in the frame are arranged in such a manner that between the bearing body and the support in the frame there is arranged a spring which permits individual cylinder adjustment. It has been found to be especially advantageous when the cylinders and their respective drives are arranged in a stationary frame and when the blocks are arranged in a displaceable frame, which can be pressed upwardly by a pressing device. In this manner, the driving motor can remain stationary and need not be moved with the frame.

BRIEF DESCRIPTION OF THE DRAWINGS

The essence of the present invention will be more fully understood from the following description of preferred embodiments shown by way of example and schematically in the accompanying drawings in which.

DESCRIPTION OF PREFERRED EMBODIMENTS

Figure 1:
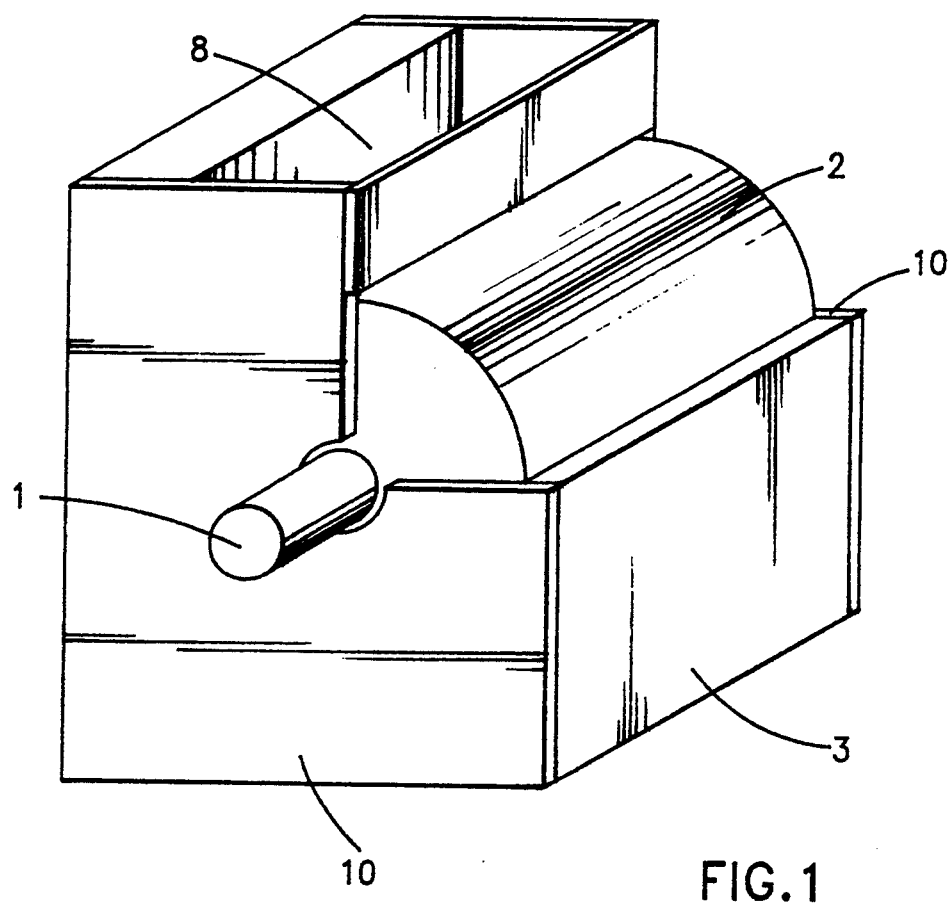
FIG. 1 is a schematic perspective view of a cylinder-shell combination.

A cylinder 2 having a shaft 1 dips into a shell which is formed in a block 3 by a shell-like recess 4, which has the form of a hollow cylinder segment. On one side, the block 3 has an upwardly directed projection 5 of which the side 6, which faces the cylinder 2, extends downwardly without interruption into the recess 4. There is thus formed between the wall 6 of the projection 5 and the upper face of the cylinder 2 a hopper-like wedge 7 in which rubber scrap thrown in the hopper 8 is drawn into the gap 9 between the recess 4 and the circumferential surface of the cylinder 2. On two opposite sides of the block 3, there are plates 10 which form side closures of the apparatus and which close opposite sides of the gap 9.

Figure 2:
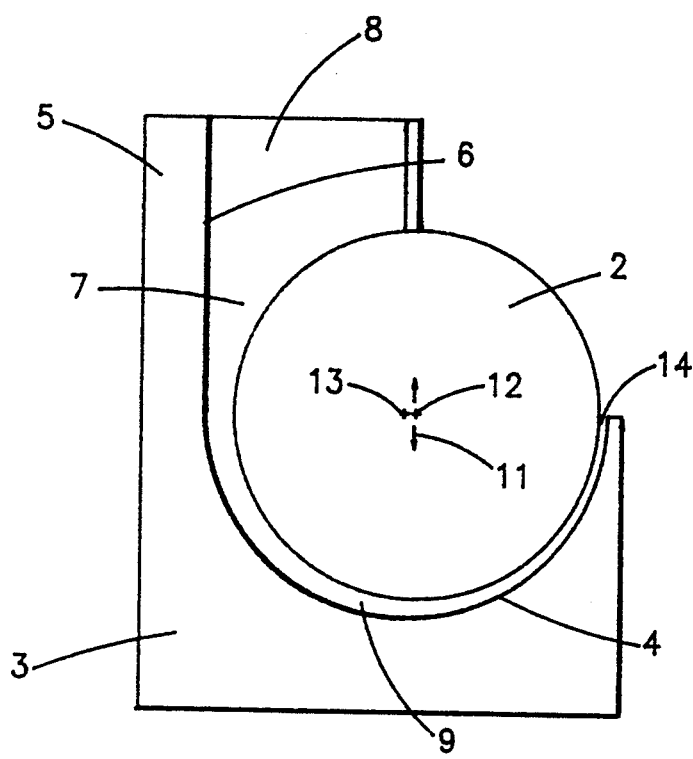
FIG. 2 is a schematic cross-section of the cylinder-shell combination of FIG. 1.
Figure 3:
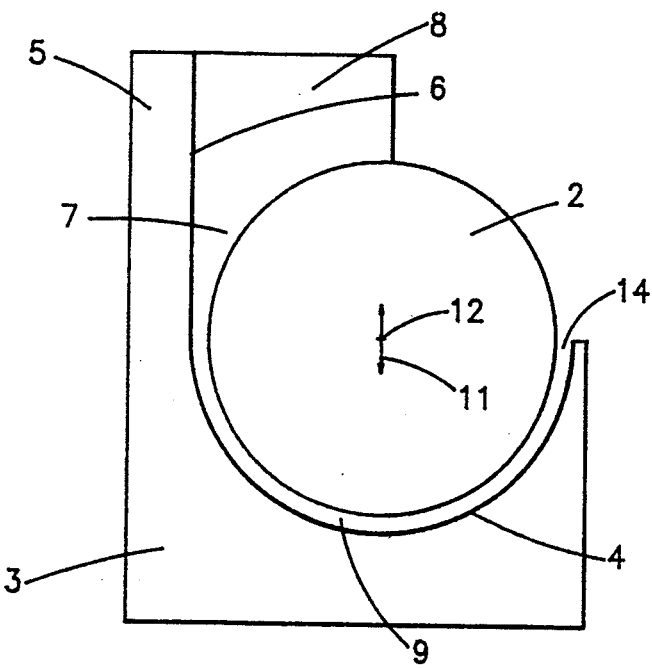
FIG. 3 is a schematic cross-section through a similar cylinder-shell combination.

The shaft 1 of the cylinder 2 can be rotatably supported in bearings of which the bearing bodies are connected fast with the block 3. However, in many cases it is advantageous when the shaft 1 is movably supported so that it can be moved vertically to a limited extent in the direction of the arrow 11 in order to adjust the width of the gap 9 as required. As shown in FIG. 3, the axis 12 of the cylinder 2 can be identical with the geometric axis 13 of the recess 4. However, the axis 12 of the cylinder 2 can also be displaced to a limited extent horizontally or at an angle with reference to the axis 13 of the recess 4, as shown in FIG. 2. In the case of FIG. 3, the gap 3 has approximately the same gap width over its entire length, whereas in the case of FIG. 2, the gap width progressively decreases from the hopper-like wedge 7 to the outlet 14.

The wall 6 can be vertical, as is shown in FIG. 2 and FIG. 3. However, as shown in FIG. 4, it can be inclined in order to provide the hopper 8 with a larger receiving volume.

Figure 4:
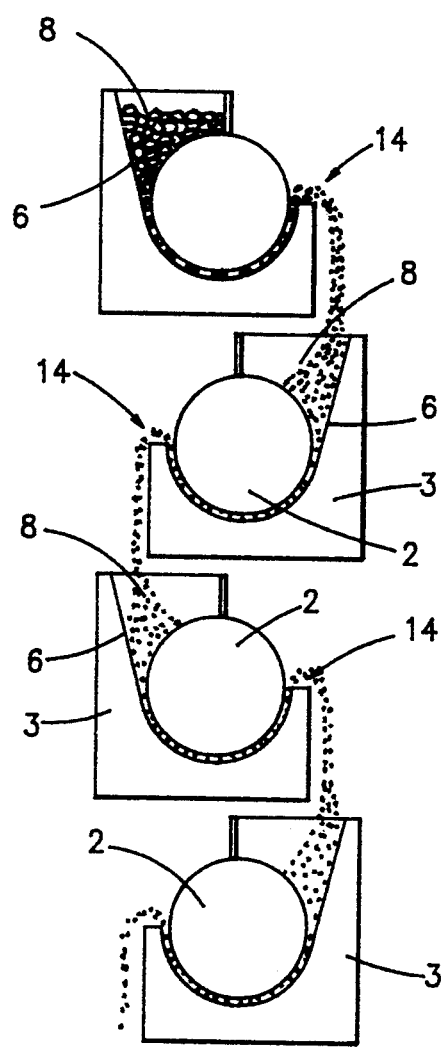
FIG. 4 is a schematic side elevation showing several cylinder-shell units arranged one above another.
Figure 5:
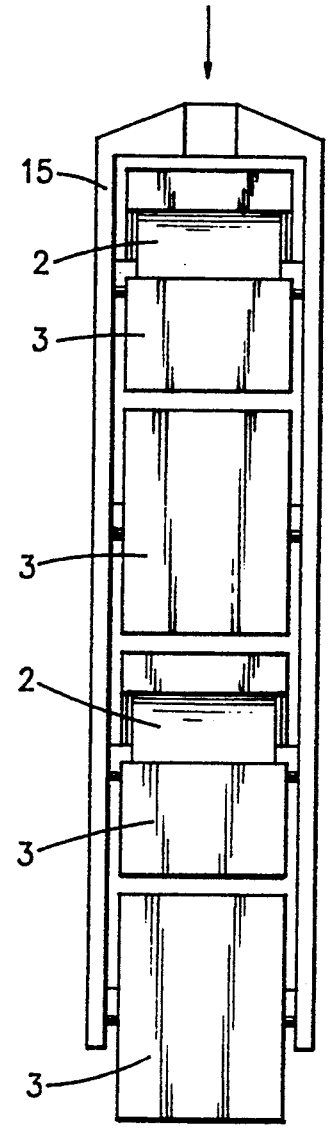
FIG. 5 is a schematic elevation of several shell-cylinder combinations of which the cylinders are pressed downwardly by a press.
Figure 6:
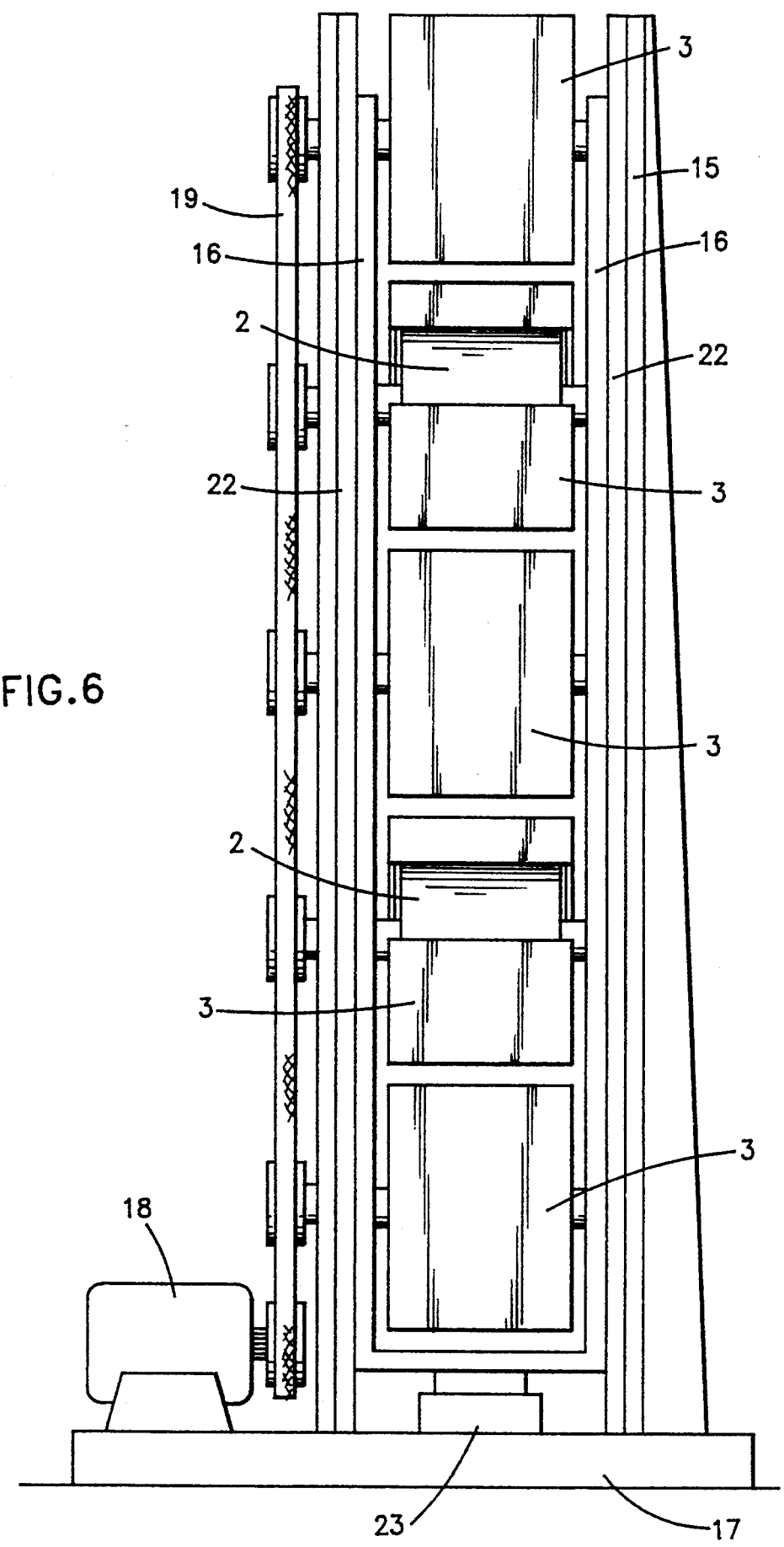
FIG. 6 is a schematic elevation of several cylinder-shell combinations arranged one above another with a raisable frame for the shells.
Figure 7:
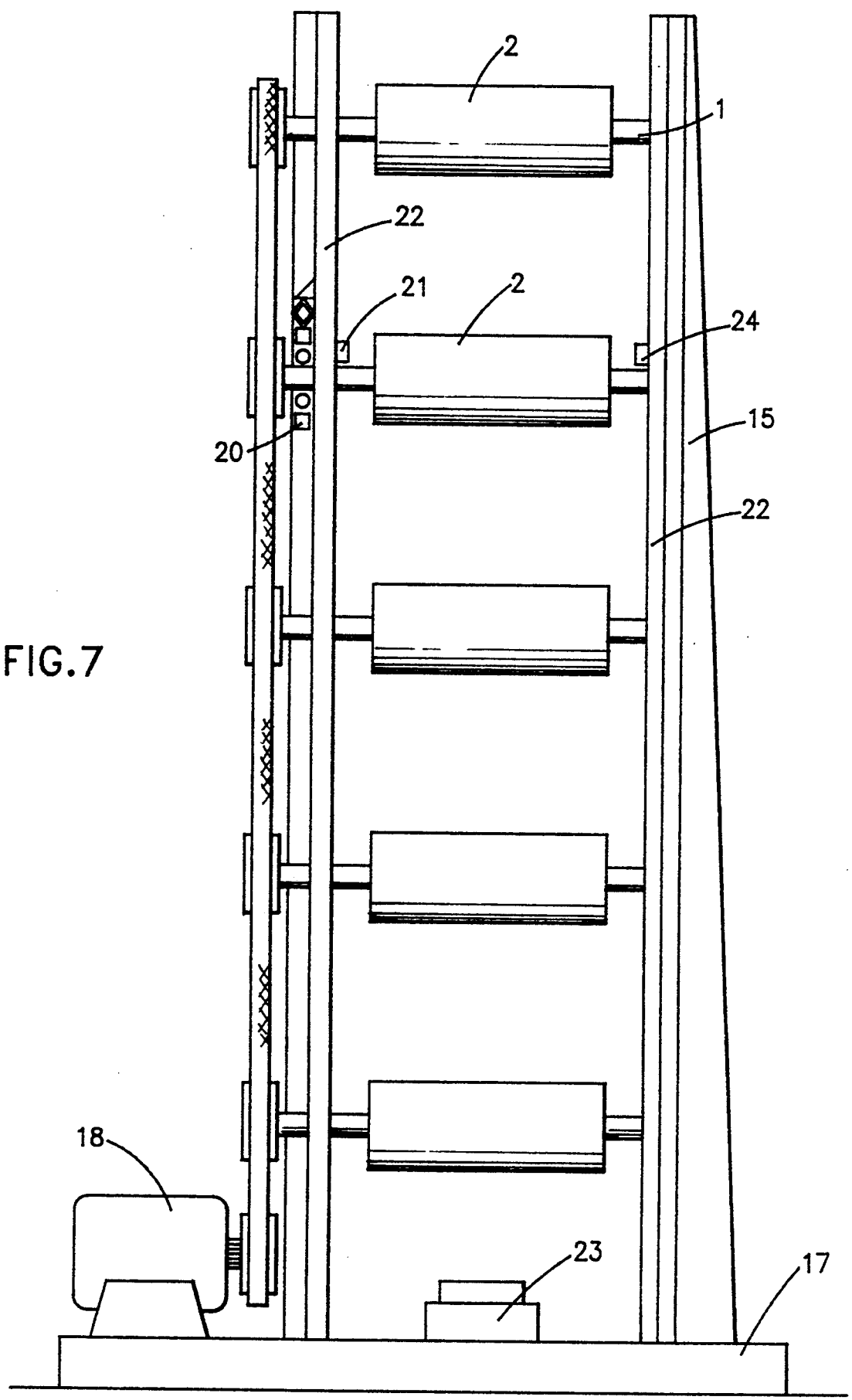
FIG. 7 is a schematic elevation of the frame with the cylinders.
Figure 8:
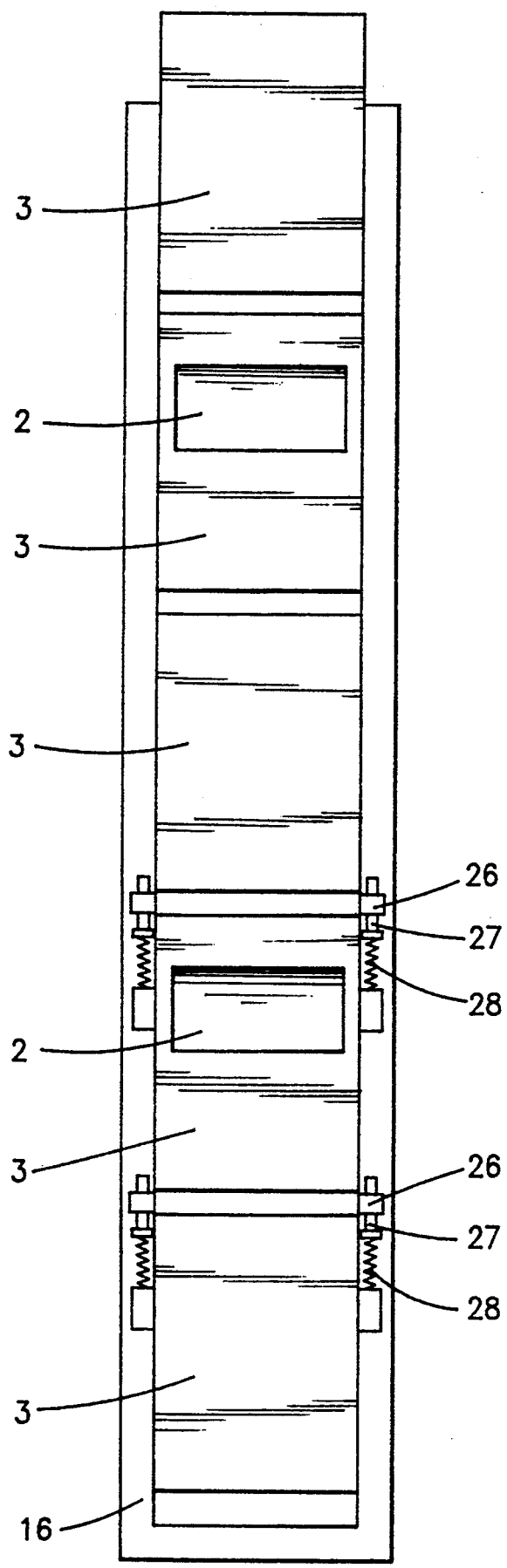
FIG. 8 is a schematic elevation of the frame with the shells.

In FIG. 4 it is shown how several cylinder 2-shell 4 units can be arranged one above another in such manner that pulverized material coming from the outlet of the upper unit is received in the hopper 8 of the next lower unit and is thereby subjected to a further pulverizing process. With such an arrangement, it is advantageous when the cylinders are arranged in a common frame 15 for the cylinders 2 and the shells 3 are arranged in a common frame 16. This is shown in FIGS. 6 to 8. The frame 15 for the cylinders 2 is mounted stationary on the factory floor 17, where the driving motor 18 is also fixedly mounted and drives the individual shafts 1 of the cylinder 2 through a belt or chain drive 19. In the frame 15, the individual shafts are supported in bearing bodies 20, which are arranged slidably against the force of springs 21. As the sliding movement is effected only by high counterforces and is then only of limited extent, plate springs can be used as the springs 21.

The frame 16 for the shells 3 with the shells 4 is arranged slidably in guide rails 22. The blocks 3 are individually and spring-mounted in the frame 16 so that the gap width 9 of each unit is individually adjustable by means of a projection 26, screw 27 and spring 28. This frame 16 can be raised by a hydraulic servo-motor 23, preferably in the form of a hydraulic cylinder-piston unit in order to decrease the gap widths corresponding to individual adjustment. In place of a hydraulic servo-motor, it is possible to use other servo-motors, for example, in the form of a spindle driven by an electric motor.

On the frame 15, there are laterally mounted bearing surfaces 24, which limit possible endwise movement of the cylinder 2 so that the gap 9 is always properly maintained and the cylinder does not rub directly on the shell-form surface 4. These displaceable bearing surfaces 24 have an oblong hole through which a screw 25 extends by means of which the mounting surface can be secured in a predetermined position.

During operation of the apparatus, heated portions of the apparatus such as the rubbing surface of the block 3 and the surface of the cylinder are advantageously cooled, for example, by flowing cooling water through cooling channels in the block and the cylinders.

What I claim is:

1. Apparatus for pulverizing rubber scrap comprising a plurality of units, each of said units comprising:
    a shell having therein an upwardly facing recess in the form of a hollow cylinder segment, said recess having a cylindrical surface,
    a rotatable cylinder having a cylindrical circumferential outer surface, said cylinder dipping into said recess in said shell to form a gap between said cylindrical circumferential outer surface of said cylinder and said cylindrical surface of said recess,
    rubber scrap feeding means comprising a hopper space between an upwardly extending surface of said shell and said circumferential outer surface of said cylinder for feeding rubber scrap into said gap,
    means for driving said cylinder reactionally in said recess to pulverize said rubber scrap in said gap,
    means for discharging pulverized rubber scrap from said recess in said shell,
    a first frame supporting shells of said plurality of said units one above another,
    a second frame supporting cylinders of a like plurality of said units in said shells,
    with said rubber scrap feeding means of each of said units, except the uppermost unit, positioned to receive pulverized rubber scrap from a superposed unit, and
    means for supporting said shells for movement at least vertically relative to one another.

2. Apparatus according to claim 1, further comprising means for moving said first frame supporting said shells vertically relative to said second frame for supporting said cylinders and thereby varying the extent to which said cylinders dip into said recesses of said shells.

3. Apparatus according to claim 2, in which said means for moving said first frame vertically comprises a hydraulic cylinder-piston unit below said first frame.

4. Apparatus according to claim 1, in which said shell of each of said units comprises a parallelepiped block in which said recess is formed.

5. Apparatus according to claim 4, in which plates on opposite sides of said parallelepiped block close opposite ends of said recess.

6. Apparatus according to claim 1, further comprising means for resiliently pressing said cylinder into said recess of said shell.

7. Apparatus according to claim 6, further comprising means for limiting the extent said cylinder is resiliently pressed into said recess.

8. Apparatus according to claim 1, in which said means for driving said cylinders of said plurality of units in rotation comprises a single motor for driving all of said cylinders in rotation and power transmitting means for transmitting power from said motor to each of said cylinders.

9. Apparatus according to claim 1, further comprising means for adjustably limiting axial movement of said cylinders in said shells.

10. Apparatus according to claim 1, further comprising means for individually pressing said cylinders into respective recesses in respective shells and for individually varying pressure with which each of said cylinders is pressed into said respective recess of said respective shell.

11. Apparatus according to claim 1, in which at least one of said cylindrical surfaces of said recess and said circumferential outer surface of said cylinder is a rough surface.

* * * * *